United States Patent
Chhabra et al.

(10) Patent No.: US 11,069,359 B2
(45) Date of Patent: Jul. 20, 2021

(54) CONTEXT-AWARE REAL-TIME MEETING AUDIO TRANSCRIPTION

(71) Applicant: Microsoft Technology Licensing, LLC, Redmond, WA (US)

(72) Inventors: Shalendra Chhabra, Seattle, WA (US); Michael J. Shelton, Tulsa, OK (US); Amit K. Agarwal, Redmond, WA (US); Halley Weitzman, Seattle, WA (US); Mikhail Raer, Tallinn (EE); Zoltan Romocsa, Redmond, WA (US); Rishi Girish, Redmond, WA (US); Skyler Michael Anderson, Los Angeles, CA (US); Tomas Bergl, Prague (CZ); Mykola Denysiuk, Tallinn (EE); Andrii Matukhno, Prague (CZ)

(73) Assignee: Microsoft Technology Licensing, LLC, Redmond, WA (US)

(*) Notice: Subject to any disclaimer, the term of this patent is extended or adjusted under 35 U.S.C. 154(b) by 160 days.

(21) Appl. No.: 16/383,332

(22) Filed: Apr. 12, 2019

(65) Prior Publication Data

US 2020/0327891 A1 Oct. 15, 2020

(51) Int. Cl.
*G10L 15/26* (2006.01)
*H04L 12/58* (2006.01)

(52) U.S. Cl.
CPC .............. *G10L 15/26* (2013.01); *H04L 51/04* (2013.01)

(58) Field of Classification Search
CPC ...... G10L 15/26; G10L 15/183; H04L 65/403
USPC ....................................................... 704/235
See application file for complete search history.

(56) References Cited

U.S. PATENT DOCUMENTS

| 10,789,576 | B2* | 9/2020 | Bellamy | H04L 65/403 |
| 2015/0106091 | A1 | 4/2015 | Larsen et al. | |
| 2019/0238354 | A1* | 8/2019 | Wiener | H04L 12/1818 |
| 2020/0279567 | A1* | 9/2020 | Adlersberg | G06F 40/279 |

OTHER PUBLICATIONS

"International Search Report and Written Opinion Issued in PCT Application No. PCT/US20/024314", dated May 19, 2020, 11 Pages.

* cited by examiner

*Primary Examiner* — Susan I McFadden
(74) *Attorney, Agent, or Firm* — Newport IP, LLC; Scott Y. Shigeta (57) ABSTRACT

A context-aware transcription system includes a language model preparation service that retrieves meeting-specific data prior to or during a meeting. The language model preparation service utilizes the meeting-specific data to generate a meeting-specific statistical language model. A speech transcription service can utilize the meeting-specific statistical language model to generate a transcription of audio generated by attendees of a meeting. The system can transmit the transcription to computing devices associated with meeting attendees during the meeting for presentation in a user interface in real time. The language model preparation service can generate the meeting-specific statistical language model in response to receiving a pre-meeting signal. The pre-meeting signal can be generated a predetermined time prior to meetings according to a schedule. The pre-meeting signal might also, or alternately, be generated in response to the receipt of meeting change event notifications before or during meetings that describe changes to the meetings.

20 Claims, 9 Drawing Sheets

CONTEXT-AWARE REAL-TIME MEETING AUDIO TRANSCRIPTION

BACKGROUND

Groups of individuals commonly meet using various types of audio and audiovisual ("A/V") meeting technologies. In meetings such as these, each meeting attendee utilizes a computing device that is configured with a meeting client application and appropriate hardware for generating audio and/or video of the attendee. During meetings, the audio and/or video generated by each attendee computing device is shared with the computing devices of the other attendees. In this way, each of the attendees can hear and/or see the other attendees in the meeting.

While meetings such as those described above can be very useful for many types of users, some meeting technologies make these kinds of meetings less beneficial for other types of meeting attendees. For example, persons with hearing impairments might have difficulty participating in such a meeting or might not be able to participate at all. Attendees in a meeting that do not speak the same language as other attendees might also not be able to communicate effectively or at all using current meeting technologies.

Technologies exist for transcribing audio; however, these technologies suffer from a number of technical limitations. For example, many transcription solutions only perform offline transcription of audio and are, therefore, of no use to meeting attendees during a meeting. Moreover, the quality of the transcriptions generated by current technologies can be poor. This can occur, for example, if meeting attendees utilize jargon, acronyms, or other types of domain-specific terminology. This can also occur when attendees in a meeting speak different languages.

Poor quality transcriptions can also cause inefficient use of computing resources, such as memory, processing cycles, storage, and power. For example, a poor quality transcription might need to be re-transcribed or edited to correct errors. This process will unnecessarily consume computing resources such as those identified above.

It is with respect to these and other technical challenges that the disclosure made herein is presented.

SUMMARY

Technologies are disclosed for context-aware real-time meeting audio transcription. Through implementations of the disclosed technologies, high quality transcriptions of the audio generated by attendees in a meeting can be performed in real time during the meeting and displayed to meeting attendees. The quality of the transcription can be improved as compared to previous solutions by generating a meeting-specific statistical language model and using the model to perform the transcription.

By generating and presenting high quality transcriptions of meeting audio in real time during meetings, meeting attendees with hearing impairments can participate in meetings more effectively. Additionally, by translating the transcriptions generated using the technologies disclosed herein, speakers of different foreign languages can more effectively participate in meetings. Finally, computing resources such as those described above might be conserved by providing higher-quality real time meeting transcriptions that do not need to be edited. Other technical benefits not specifically mentioned herein can also be realized through implementations of the disclosed subject matter.

In order to realize the technical benefits mentioned briefly above, a context-aware transcription system is provided. The context-aware transcription system can generate high quality transcriptions of audio generated during meetings using meeting-specific statistical language models. In particular, the context-aware transcription system can include a language model preparation service that retrieves meeting-specific data prior to or during a meeting. The meeting-specific data can include, but is not limited to, messages generated by or otherwise associated with meeting attendees, attachments to messages, names of meeting attendees, or files created by or otherwise associated with meeting attendees. The meeting-specific data can include jargon, acronyms, or other types of domain-specific terminology associated with the meeting attendees.

Once the language model preparation service has collected the meeting-specific data, this service utilizes the meeting-specific data to generate a meeting-specific statistical language model. In some configurations, the meeting-specific statistical language model is stored during the duration of the meeting for resiliency purposes and destroyed after the end of the meeting.

A speech transcription service can utilize the meeting-specific statistical language model to generate a text transcription of the audio of the meeting. In some configurations, the speech transcription service utilizes the meeting-specific statistical language model in conjunction with a base (i.e. non-domain-specific) language model to generate transcriptions.

In some configurations, the transcriptions are transmitted to computing devices associated with meeting attendees during the meeting. The computing devices are configured to present the transcriptions during the meeting in a user interface ("UI") in real or near-real time. The UI can, for instance, overlay the text of the transcriptions on video content generated by attendees during the meeting.

In some configurations, the language model preparation service generates the meeting-specific statistical language model in response to receiving a pre-meeting signal generated by a schedule processor and trigger service ("STS"). The pre-meeting signal can include data describing the meeting such as, for example, data identifying the meeting and data identifying a start time of the meeting.

In order to generate the pre-meeting signal, the STS can retrieve a list of upcoming meetings on a predefined schedule (e.g. once per day). With this data and the start time of a meeting, the STS can generate a pre-meeting signal a predetermined amount of time (e.g. one hour) prior to the start time of the meeting. In this manner, generation of a meeting-specific statistical language model for a meeting can begin at the predetermined amount of time prior to the meeting.

The STS might also, or alternately, subscribe to receive meeting change event notifications describing changes to a meeting such as, for example, the addition or removal of attendees, the addition or removal of files, or the modification of the start time of the meeting. The STS can generate a pre-meeting signal in response to receiving a meeting change event notification. This can occur prior to or during a meeting. For example, additional signals might be generated during a meeting as participants join or leave a meeting. In this manner, the meeting-specific statistical language model for a meeting can be updated with additional or modified meeting-specific data prior to or during the meeting to keep the context for the transcription focused to active participants and further increase the accuracy of the generated transcriptions.

It should be appreciated that the above-described subject matter can be implemented as a computer-controlled apparatus, a computer-implemented method, a computing device, or as an article of manufacture such as a computer readable medium. These and various other features will be apparent from a reading of the following Detailed Description and a review of the associated drawings.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for context-aware real-time meeting audio transcription. As discussed briefly above, implementations of the disclosed technologies can generate high quality transcriptions of the audio generated by attendees in a meeting in real time. By generating and presenting high quality transcriptions of meeting audio in real time during meetings, meeting attendees with hearing impairments can participate in meetings more effectively. Additionally, computing resources can be conserved by providing higher-quality real time meeting transcriptions that do not need to be edited. Other technical benefits not specifically mentioned herein can also be realized through implementations of the disclosed subject matter.

While the subject matter described herein is presented in the general context of a network service configured for context-aware real-time audio transcription, those skilled in the art will recognize that other implementations can be performed in combination with other types of computing systems and modules. For example, the disclosed technologies can be utilized for live captioning and translation. Those skilled in the art will also appreciate that the subject matter described herein can be practiced with other computer system configurations, including hand-held devices, multi-processor systems, microprocessor-based or programmable consumer electronics, computing or processing systems embedded in devices (such as wearable computing devices, automobiles, home automation etc.), minicomputers, mainframe computers, and the like.

In the following detailed description, references are made to the accompanying drawings that form a part hereof, and which are shown by way of illustration specific configurations or examples. Referring now to the drawings, in which like numerals represent like elements throughout the several FIGS., aspects of the configuration and operation of a context-aware transcription system will be described.

Figure 1:
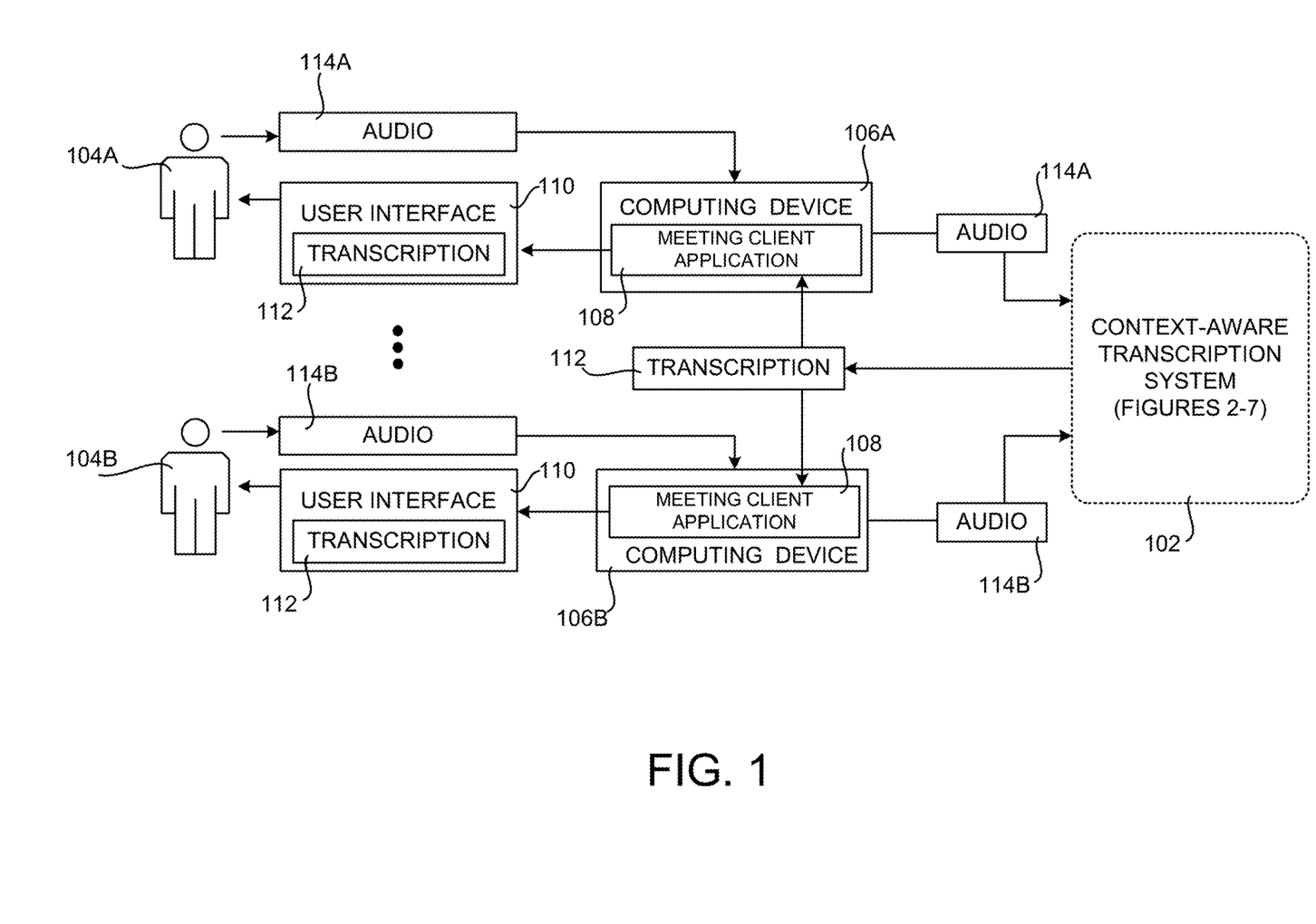
FIG. 1 is a computing architecture diagram that shows aspects of the configuration and operation of a context-aware transcription system, according to one embodiment disclosed herein.

FIG. 1 is a computing architecture diagram that shows aspects of the configuration and operation of a context-aware transcription system 102, according to one embodiment disclosed herein. As will be described in greater detail with regard to FIGS. 2-7, the context-aware transcription system 102 can generate high quality transcriptions of audio generated during meetings in real time using meeting-specific statistical language models.

In one particular embodiment, groups of individuals can meet using an associated computing device and appropriate hardware and software. In particular, the attendees 104A and 104B (which might be referred to herein collectively as the "attendees 104" or singularly as an "attendee 104) in a meeting can utilize an associated computing device 106A and 106B (which might be referred to herein collectively as the "computing devices 106" or singularly as a "computing device 104"), respectively.

The computing devices 106 are configured with a meeting client application 108 and appropriate hardware (e.g. a microphone or webcam) for generating audio 114A and 114B, respectively, and/or video of a meeting attendee 104. The meeting client application 108 might be the SKYPE, SKYPE FOR BUSINESS, or TEAMS meeting client applications from MICROSOFT CORP., the ZOOM meeting client application from ZOOM VIDEO COMMUNICATIONS, the CHIME meeting client application from AMAZON.COM, INC., or another application from another vendor that facilitates audio and/or video conferencing.

During meetings, meeting client application 108 shares the audio 114 and/or video generated by each attendee computing device 106 with the computing devices 106 of the other attendees 104. In this way, each of the attendees 104 can hear and/or see the other attendees 104 in the meeting. It is to be appreciated that networking components, server computers, and software components other than those shown in FIG. 1 can be utilized to enable this functionality.

In some configurations, the context-aware transcription system 102 operates in conjunction with the meeting client application 108 to transcribe spoken words in the audio 114 to generate a text transcription 112 of a meeting. In order to enable this functionality, the meeting client application transmits the audio 114 generated by a computing device 106 to the context-aware transcription system 102. In turn, the context-aware transcription system 102 generates a transcription 112 of the audio 114 in real time. Details regarding the generation of the transcription 112 will be provided below with regard to FIGS. 2-7.

In some configurations, the transcription 112 is transmitted to the computing devices 106 associated with meeting attendees 104 during a meeting. The meeting client application 108 can receive the transcription 112 and present the transcription 112 to the attendees 104 during the meeting in a UI 110 in real time. The UI 110 can, for instance, overlay the text of the transcription 112 on video content generated by the computing devices 106 during the meeting. Details regarding one such UI 110 will be provided below with regard to FIG. 6.

Figure 2:
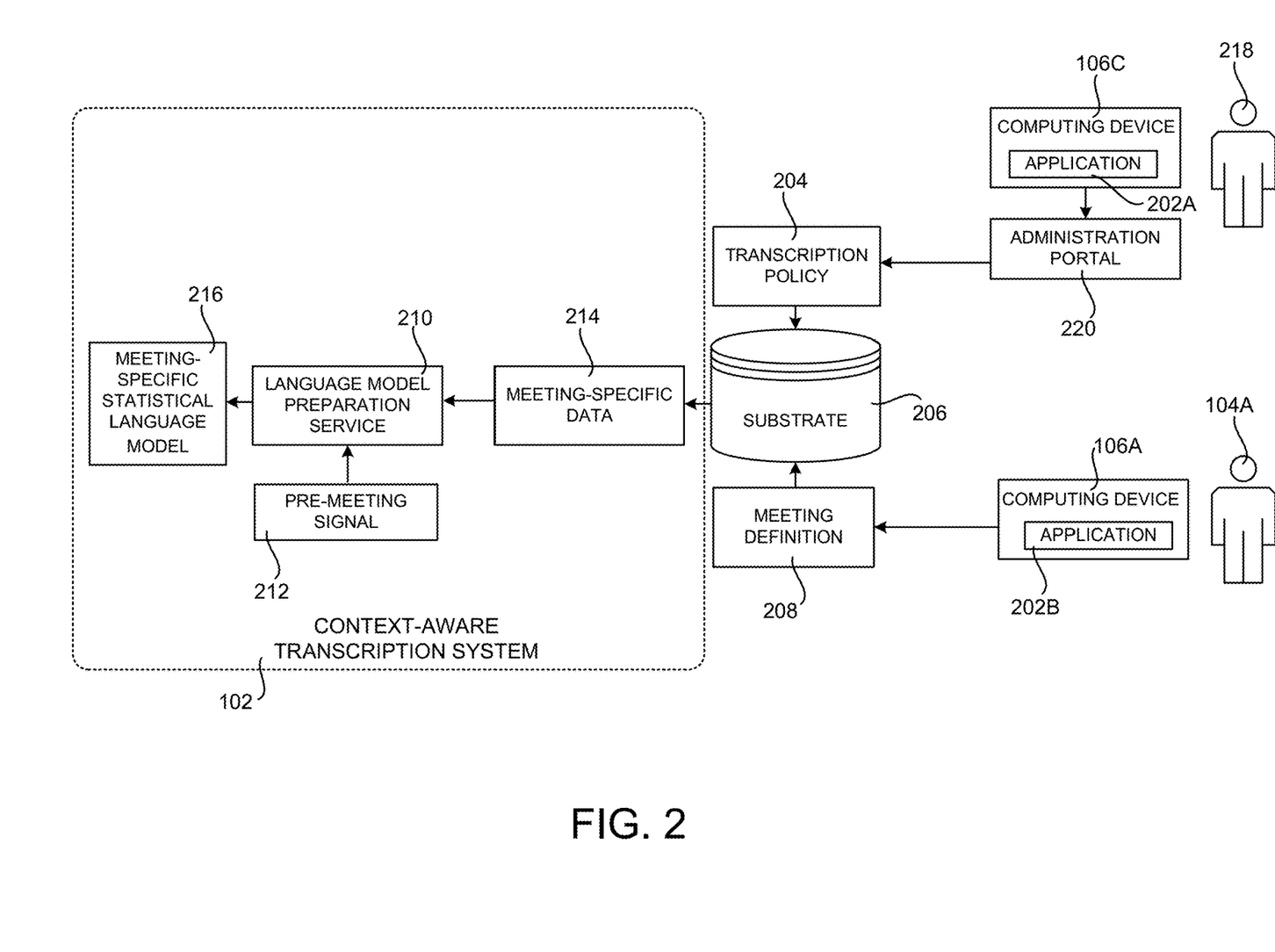
FIG. 2 is a computing architecture diagram that shows aspects of the configuration and operation of the context-aware transcription system shown in FIG. 1 for generating a meeting-specific statistical language model, according to one embodiment disclosed herein.

FIG. 2 is a computing architecture diagram that shows additional aspects of the configuration and operation of the context-aware transcription system 102 shown in FIG. 1 and described briefly above. In particular, FIG. 2 illustrates aspects of the context-aware transcription system 102 for generating a meeting-specific statistical language model 216 for use in transcribing the audio 114 of a meeting.

In some configurations, a transcription policy 204 can be defined that includes data specifying whether transcriptions 112 are to be generated for meetings scheduled by users in an organization. For example, a user 218 with appropriate administrator privileges can utilize a computing device 106C and an application program 202A (e.g. a web browser application) to access an administration portal 220.

Through the administration portal 220, the user 218 can define a transcription policy 204 that indicates that transcriptions 112 are to be generated. The transcription policy 204 can be stored in a substrate 206 that includes storage and processing facilities. The substrate 206 might be integrated with the context-aware transcription system 102 or implemented by another system in other configurations.

As shown in FIG. 2, a meeting attendee 104A, or another user, can utilize a computing device 106B and an application 202B (e.g. a personal information manager ("PIM") application or another type of local or web-based calendaring application) to schedule a meeting with one or more other attendees 104. Data describing the meeting is stored in a meeting definition 208, which is also persisted in the substrate 206 in some configurations.

The meeting definition 208 can include various types of data regarding a meeting including, but not limited to, a unique identifier for the meeting, the date and time of the meeting, and a list of the attendees 104 of the meeting. The meeting definition 208 can include other types of data not specifically identified herein.

As also shown in FIG. 2, the context-aware transcription system 102 includes a language model preparation service 210 in some configurations. The language model preparation service 210 is a network service that can retrieve meeting-specific data 214 prior to or during a meeting. The meeting-specific data 214 can include, but is not limited to, messages (e.g. email, text messages, instant messages, etc.) generated by or otherwise associated with meeting attendees 104, file attachments to messages, names of meeting attendees 104, or files created by or otherwise associated with meeting attendees 104.

The meeting-specific data 214 can be retrieved for a predefined period of time. For example, the previous six months (or other time period) of messages for each of the meeting attendees can be retrieved. The meeting-specific data 214 can include jargon, acronyms, or other types of domain-specific terminology associated with the meeting attendees 104. The meeting-specific data 214 can be identified based upon the meeting definition 208 (e.g. the list of attendees) and/or other types of information.

Once the language model preparation service 210 has collected the meeting-specific data 214, this service 210 utilizes the meeting-specific data 214 to generate a meeting-specific statistical language model 216. In some configurations, the meeting-specific statistical language model 216 is stored in the substrate 206 during the duration of the meeting for resiliency purposes and deleted after the end of the meeting.

The meeting-specific statistical language model 216 defines a probability distribution that can be used to predict the next word in a sequence given the words that proceed it. Such a language model learns the probability of word occurrence based on examples of text, such as the meeting-specific data 214. In this way, the meeting-specific statistical language model can be used to determine probabilities of spoken words in the audio and to generate a transcription based upon the computed probabilities.

Various technologies can be used to implement the meeting-specific statistical language model 216 including, but not limited to, incremental language models, n-gram language models, uniform distribution (zero-gram) language models, unigram language models, bigram language models, skip language models, class language models, topic language models, neural network language models, long short term memory ("LSTM") models, or recurrent neural network language models.

Figure 3:
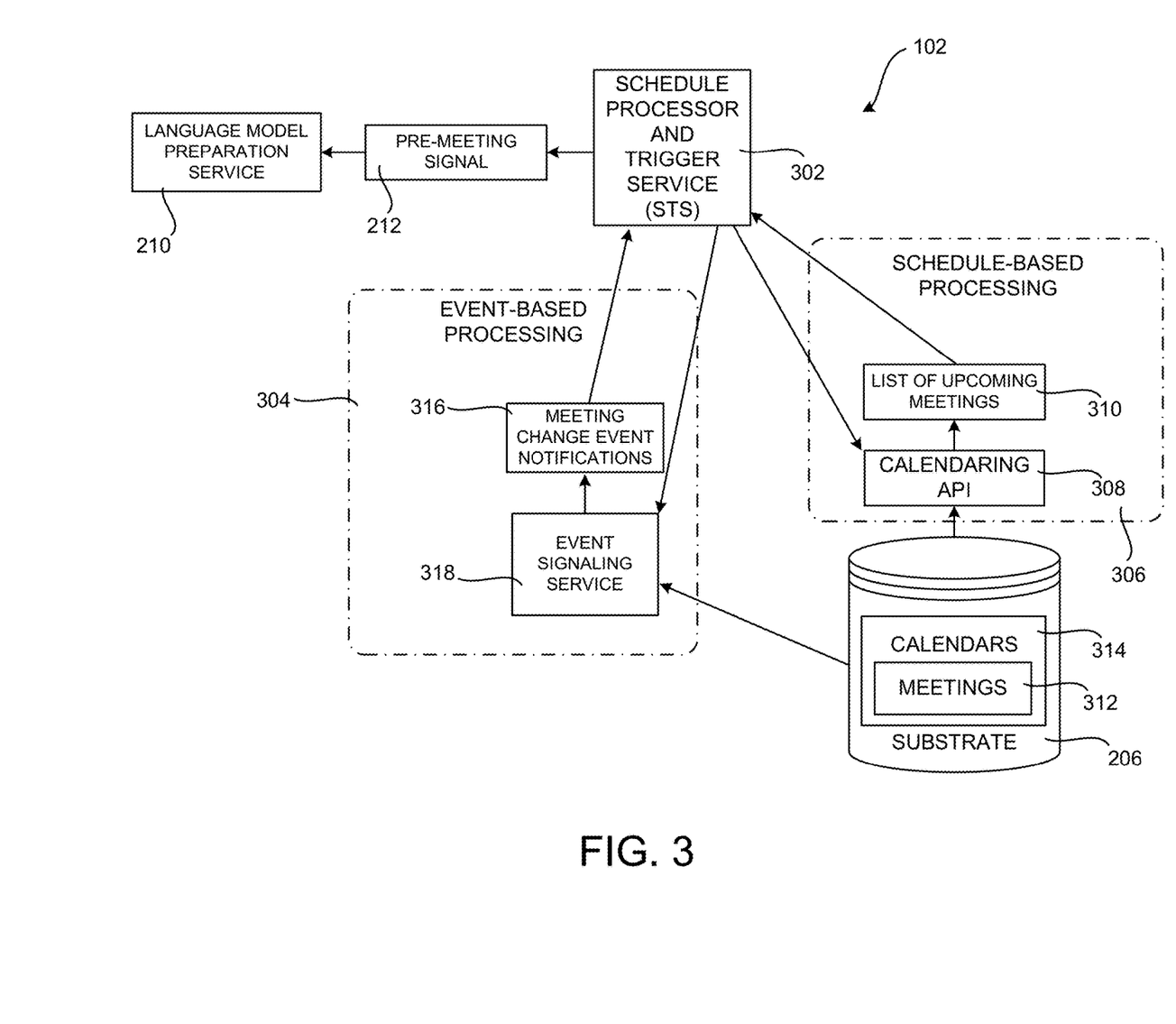
FIG. 3 is a computing architecture diagram that shows aspects of the configuration and operation of the context-aware transcription system shown in FIGS. 1 and 2 for generating a pre-meeting signal used to trigger generation of a meeting-specific statistical language model, according to one embodiment disclosed herein.

In some configurations, the language model preparation service 210 generates the meeting-specific statistical language model 216 in response to receiving a pre-meeting signal 212 generated by a schedule processor and trigger service ("STS") 302 (shown in FIG. 3). As will be described in greater detail below, the pre-meeting signal 212 can include data describing a meeting such as, for example, data identifying the meeting and data identifying a start time of the meeting. Details regarding the generation of the pre-meeting signal 212 are provided below with regard to FIGS. 3 and 4.

As will also be described in greater detail below, a speech transcription service 502 (shown in FIG. 5) can utilize the meeting-specific statistical language model 216 to generate a text transcription 112 of the audio 114 of a meeting. In some configurations, the speech transcription service 502 utilizes the meeting-specific statistical language model 216 in conjunction with a base (i.e. non-domain-specific) language model to generate transcriptions 112. Details regarding the operation of the speech transcription service 502 will be provided below with regard to FIG. 5.

FIG. 3 is a computing architecture diagram that shows aspects of the configuration and operation of the context-aware transcription system 102 shown in FIGS. 1 and 2 for generating a pre-meeting signal 212 that triggers the generation of a meeting-specific statistical language model 216, according to one embodiment disclosed herein. As discussed briefly above, a network service, referred to herein as the schedule processor and trigger service ("STS") 302, generates the pre-meeting signal 212 in some configurations.

In order to generate the pre-meeting signal 212, the STS 302 can utilize schedule-based processing 306 and/or event-based processing 304. When schedule-based processing 306 is utilized, the STS 302 retrieves a list 310 of upcoming meetings on a predefined schedule (e.g. once per day). For example, and without limitation, the STS 302 might call a calendaring application programming interface ("API") 308 to retrieve a list of upcoming meetings 310 for a predetermined period of time in the future (e.g. seven days) from the substrate 206 according to a predefined schedule. The list of meetings 310 can be generated based upon data defining the meetings 312 on users' calendars 314 stored in the substrate 206 or in another location.

Using data identifying the start time of the meetings specified in the list 310 of upcoming meetings, the STS 302 can generate a pre-meeting signal 212 a predetermined amount of time (e.g. one hour) prior to the start time of each meeting. For example, and without limitation, if a meeting is scheduled to begin at 2:00 pm, the STS 302 can transmit a pre-meeting signal 212 to the language model preparation service 210 for the meeting at 1:00 pm. As described briefly above, the language model preparation service 210 generates a meeting-specific statistical language model 216 for the meeting identified by the pre-meeting signal 212. In this manner, generation of a meeting-specific statistical language model 216 for a meeting can begin at a predetermined amount of time prior to the start of the meeting.

As mentioned above, the STS might also, or alternately, user event-based processing 302 to trigger generation of pre-meeting signals 212 for meetings. In order to utilize event-based processing 302, the STS 302 can subscribe to receive meeting change event notifications 316. In one particular embodiment, for example, an event signaling service 318 can generate meeting change event notifications 316 responsive to detecting that a meeting has changed. For example, the event signaling service 318 might generate a meeting change event notification 316 responsive to detecting the addition or removal of attendees to/from a meeting, the addition or removal of files associated with a meeting, or the modification of the start time of the meeting. The meeting change event notification 316 includes data describing the detected changes to a meeting.

Once the STS 302 has subscribed to receive meeting change event notifications 316, the STS 302 can generate a pre-meeting signal 212 in response to receiving a meeting change event notification 316. This can occur prior to or during a meeting. In this manner, the meeting-specific statistical language model 216 for a meeting can be updated with additional or modified meeting-specific data 214 prior to or during the meeting to further increase the accuracy of the generated transcription 112 of the meeting. For example, the meeting-specific statistical language model 216 for a meeting might be updated with meeting-specific data 214 associated with a new attendee 104 when a notification 316 is received indicating that the new attendee 104 has joined a meeting. The meeting-specific statistical language model 216 might be updated in a similar fashion following receipt of a notification 316 indicating that an attendee 104 has left a meeting. As discussed briefly above, schedule-based processing 306 and event-based processing 304 are both utilized to generate pre-meeting signals 212 in some configurations.

Figure 4:
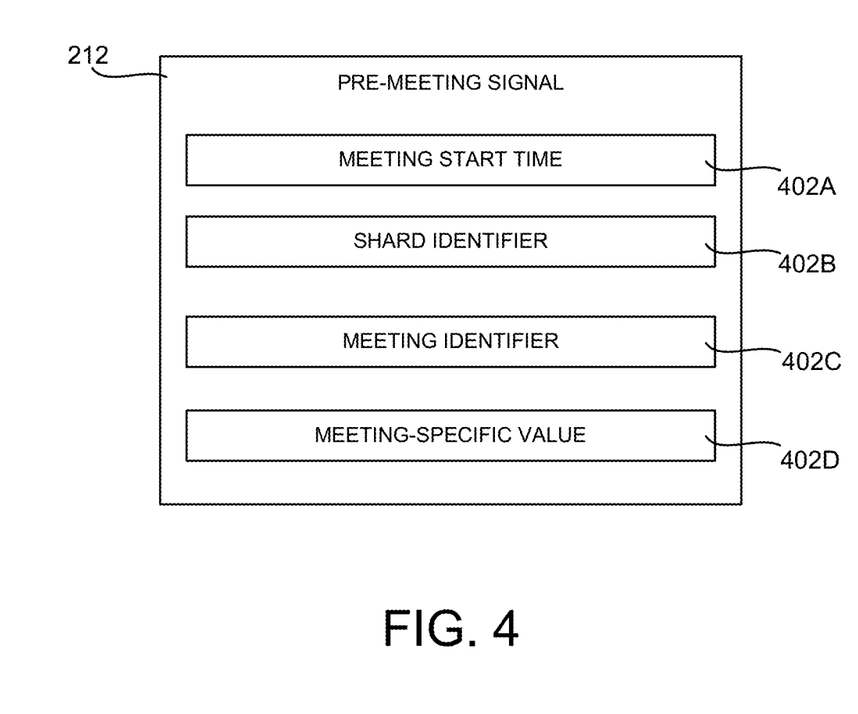
FIG. 4 is a data structure diagram showing aspects of the configuration of a pre-meeting signal used to trigger generation of a meeting-specific statistical language model, according to one embodiment disclosed herein.

FIG. 4 is a data structure diagram showing aspects of the configuration of an illustrative pre-meeting signal 212 used to trigger generation of a meeting-specific statistical language model 216, according to one embodiment disclosed herein. In the embodiment shown in FIG. 4, the pre-meeting signal 212 includes data 402A identifying the start time of a meeting, data 402B identifying a shard (i.e. a database) where information regarding the meeting can be found, data 402C specifying a unique identifier for the meeting, and data 402D containing a meeting-specific value.

As will be described in greater detail below, the language model preparation service 210 can utilize the data contained in the pre-meeting signal 212 to obtain the meeting-specific data 214 for the meeting identified by the pre-meeting signal 212. Additional details regarding this process are provided below with regard to FIG. 5.

Figure 5:
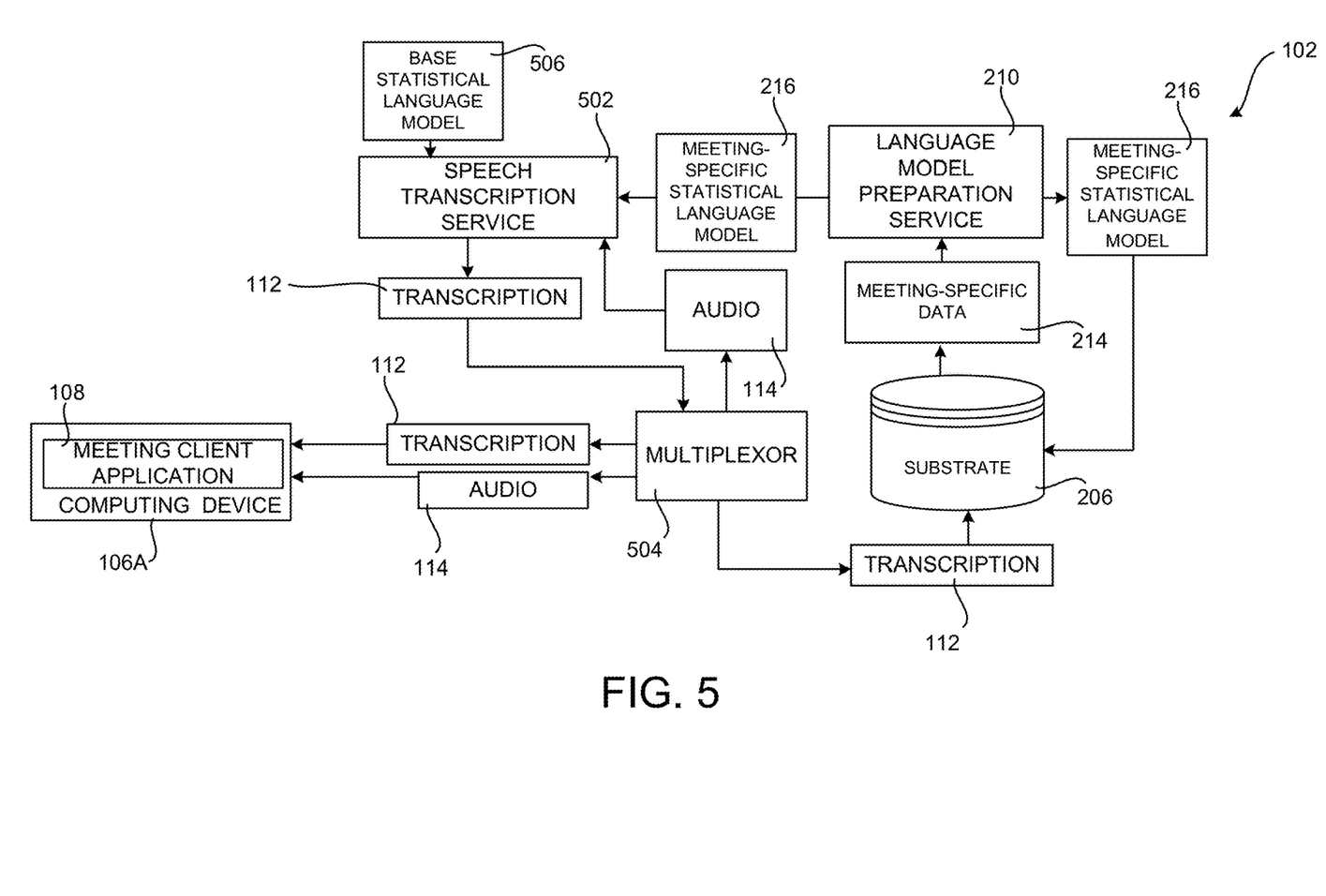
FIG. 5 is a computing architecture diagram that shows additional aspects of the configuration and operation of the context-aware transcription system shown in FIGS. 1-3 for performing real-time meeting transcription using a meeting-specific statistical language model, according to one embodiment disclosed herein.

FIG. 5 is a computing architecture diagram that shows additional aspects of the configuration and operation of the context-aware transcription system 102 shown in FIGS. 1-3 and described above for performing real-time meeting transcription using a meeting-specific statistical language model 216, according to one embodiment disclosed herein. As discussed briefly above, the receipt of a pre-meeting signal 212 triggers the language model preparation service 210 to generate a meeting-specific statistical language model 216 for the meeting identified by the pre-meeting signal 212.

In order to generate the pre-meeting signal 212 for a meeting, the language model preparation service 212 uses the data contained in the pre-meeting signal 212 to locate and retrieve meeting-specific data 214 for the meeting from the substrate 206 and/or another location. As discussed above, the meeting-specific data 214 can include, but is not limited to, messages (e.g. email, text messages, instant messages, etc.) generated by or otherwise associated with meeting attendees 104, file attachments to messages, names of meeting attendees 104, or files created by or otherwise associated with meeting attendees 104. The meeting-specific data 214 can include jargon, acronyms, or other types of domain-specific terminology associated with the meeting attendees 104.

Once the language model preparation service 210 has generated the meeting-specific statistical model 216, the language model preparation service 210 can store the meeting-specific statistical language model 216 in the substrate 206 or at another location. As discussed above, the meeting-specific statistical language model 216 can be stored during the duration of a meeting for resiliency purposes and destroyed after the end of the meeting in some configurations.

As shown in FIG. 5, the language model preparation service 210 also provides the meeting-specific statistical language model 216 to the speech transcription service 502. As described briefly above, the speech transcription service 502 is a network service configured to receive the audio 114 of a meeting and to generate a text transcription 112 of the speech contained in the audio 114. In order to provide this functionality, a multiplexor 504 is utilized in one configuration to receive the audio 114 of a meeting from the participating computing devices 106. The multiplexor 504 provides the audio 114 to the speech transcription service 502. As shown in FIG. 5, the multiplexor 504 can also provide the audio 114 to each of the participating computing devices 106.

The speech transcription service 502 receives the audio 114 and utilizes the meeting-specific statistical language model 216 to generate a transcription 112 of the audio 114 in real time (i.e. as the attendees 104 speak). The speech transcription service 502 utilizes the meeting-specific statistical language model 216 in conjunction with a base statistical language model 506 in some configurations. The meeting-specific statistical language model 216 includes domain-specific (i.e. meeting-specific) terms, while the base statistical language model 506 typically does not include domain-specific terminology.

As with the meeting-specific statistical language model 216, the base statistical language model 506 also defines a probability distribution that can be used to predict the next word in a sequence given the words that proceed it. Various technologies can be used to implement the base statistical language model 506 including, but not limited to, incremental language models, n-gram language models, uniform distribution (zero-gram) language models, unigram language models, bigram language models, skip language models, class language models, topic language models, neural network language models, or recurrent neural network language models.

The speech transcription service 502 provides the transcription 112 to the multiplexor 504 as it is generated. In turn, the multiplexor 504 provides the transcription 112 to the instances of the meeting client application 108 executing on the computing devices 106 participating in the meeting. The multiplexor 504 can also store the transcription 112 in the substrate 206 for future retrieval and review.

As discussed above, the meeting client application 108 presents the transcription 112 in a UI 110 in real time during the meeting. One illustrative UI 110 for presenting the transcription 112 is described below with reference to FIG. 6.

Figure 6:
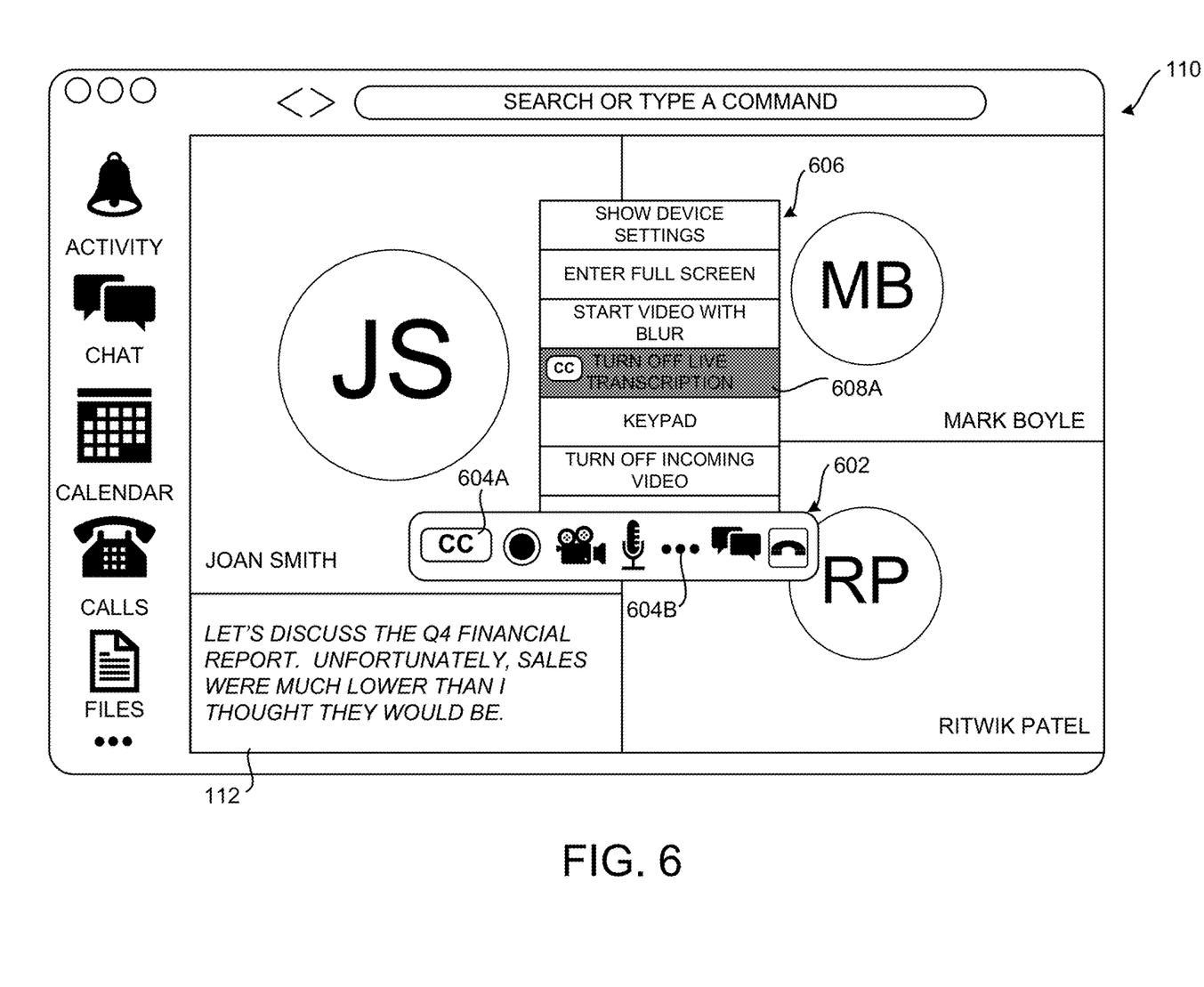
FIG. 6 is a user interface diagram showing aspects of an illustrative user interface for presenting a transcription of the audio of a meeting using the context-aware transcription system shown in FIGS. 1-5, according to one embodiment disclosed herein.

FIG. 6 is a user interface diagram showing aspects of an illustrative UI 110 for presenting a transcription 112 of the audio 114 of a meeting using the context-aware transcription system 102 shown in FIGS. 1-5, according to one embodiment disclosed herein. As shown in FIG. 6, the UI 110 can present the transcription 112 in real time as it is being generated by the speech transcription service 502.

As also shown in FIG. 6, the IU 110 can include a number of UI elements for controlling the presentation of the transcription 112. For example, and without limitation, the UI 110 can include a menu 602 having a UI control 604A which, when selected, will turn the presentation of the transcription 112 in the UI 110 on or off. The menu 602 can include UI controls for performing other types of functionality including, but not limited to, recording the meeting, turning video or audio on or off, for showing a chat window, and for ending the meeting. The menu 602 can include other UI controls for performing other types of functionality in other configurations.

A menu 606 can also be presented in the UI 110 that includes a menu item 608A which, when selected, will turn generation of the transcription 112 on or off. The menu 606 can include menu items for performing other types of functions including, but not limited to, showing device settings, entering a full screen mode, starting video with a blurred background, showing a keypad, or for turning off incoming video. The menu 606 can include other UI controls for performing other types of functionality in other configurations. In this regard, it is to be appreciated that the illustrative configuration of the UI 110 shown in FIG. 6 is merely illustrative and that other types of user interfaces can be utilized to present the transcription 112 in real time.

Figure 7:
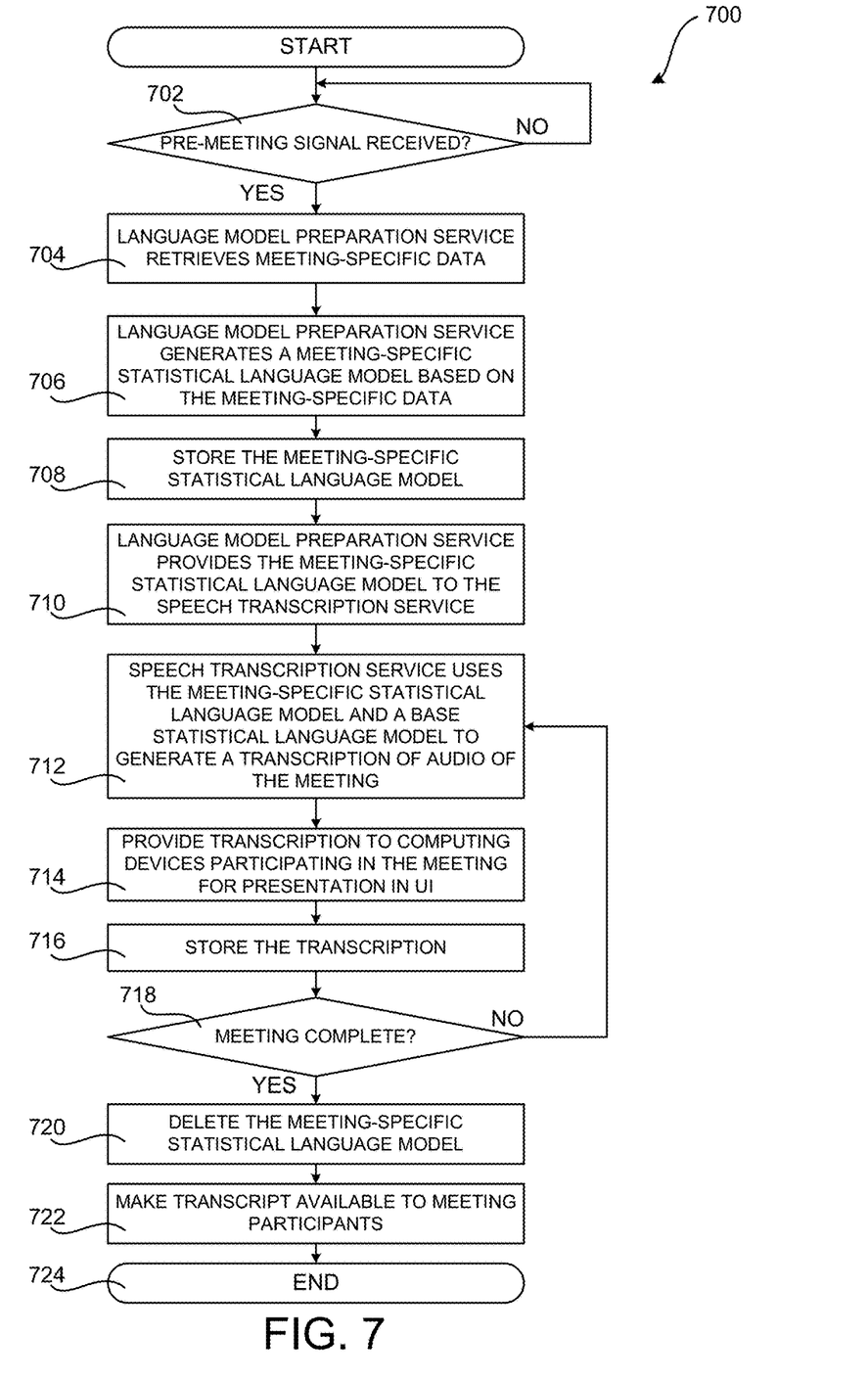
FIG. 7 is a flow diagram showing a routine that illustrates aspects of the operation of the context-aware transcription system described with reference to FIGS. 1-6 for generating a transcription of the audio of a meeting in real time, according to one embodiment disclosed herein.

FIG. 7 is a flow diagram showing a routine 700 that illustrates aspects of the operation of the context-aware transcription system 102 described above with reference to FIGS. 1-6 for generating a transcription 112 of the audio 114 of a meeting in real time, according to one embodiment disclosed herein. It should be appreciated that the logical operations described herein with regard to FIG. 7, and the other FIGS., can be implemented (1) as a sequence of computer implemented acts or program modules running on a computing device and/or (2) as interconnected machine logic circuits or circuit modules within a computing device.

The particular implementation of the technologies disclosed herein is a matter of choice dependent on the performance and other requirements of the computing device. Accordingly, the logical operations described herein are referred to variously as states, operations, structural devices, acts, or modules. These states, operations, structural devices, acts and modules can be implemented in hardware, software, firmware, in special-purpose digital logic, and any combination thereof. It should be appreciated that more or fewer operations can be performed than shown in the FIGS. and described herein. These operations can also be performed in a different order than those described herein.

The routine 700 begins at operation 702, where the language model preparation service 210 determines if a pre-meeting signal 212 for a meeting was received from the STS 302. As discussed above, the STS 302 can utilize schedule-based processing 306 and event-based processing 304 to determine when to generate a pre-meeting signal 212 for a meeting. If the language model preparation service 210 receives a pre-meeting signal 212 for a meeting, the routine 700 proceeds from operation 702 to operation 704.

At operation 704, the language model preparation service 210 retrieves meeting-specific data 214 for the meeting identified by the received pre-meeting signal 212. The meeting-specific data 214 can be retrieved from the substrate 206 and/or from another location or locations. The routine 700 then proceeds from operation 704 to operation 706.

At operation 706, the language model preparation service 210 generates a meeting-specific statistical language model 216 using the meeting-specific data 214 retrieved at operation 704. The routine 700 then proceeds to operation 708, where the language model preparation service 210 stores the meeting-specific statistical language model 216 in the substrate 206. The routine 700 the proceeds from operation 708 to operation 710.

At operation 710, the language model preparation service 210 provides the meeting-specific statistical language model 216 to the speech transcription service 502. The routine 700 then proceeds from operation 710 to operation 712, where the speech transcription service 502 uses the meeting-specific statistical language model 216 to generate a transcription 112 of the audio 114 of a meeting. In some configurations, the speech transcription service 502 utilizes the meeting-specific statistical language model 216 and a base statistical language model 506 to generate the transcription 112.

From operation 712, the routine 700 proceeds to operation 714, where the multiplexor 504, or another component, provides the transcription 112 to the computing devices 106 participating in the meeting. In turn, the meeting client application 108 executing on the computing devices 106 receives the transcription 112 and presents the transcription 112 in the UI 110 described above. The routine 700 then proceeds from operation 714 to operation 716, where the multiplexor 504 stores the transcription 112 in the substrate 206 or another location for future utilization.

From operation 716, the routine 700 proceeds to operation 718, where a determination is made as to whether the meeting is complete. If the meeting is not complete, the routine 700 proceeds back to operation 712, where the speech transcription service 502 continues to generate a transcription 112 of the audio 114 of the meeting in the manner described above. As also described above, the meeting-specific statistical language model 216 can be updated during the meeting based upon meeting change event notifications 316 received from the event signaling service 318. If the meeting is complete, the routine 700 proceeds from operation 718 to operation 720.

At operation 720, the meeting-specific statistical language model 720 can be deleted from the substrate 206. Additionally, at operation 722, the complete transcription 112 of the meeting can be made available to the meeting attendees 104. For example, the meeting client application 108 can provide functionality for enabling attendees 104 to review the complete transcription 112 of the meeting. The routine 700 then proceeds from operation 722 to operation 724, where it ends.

Figure 8:
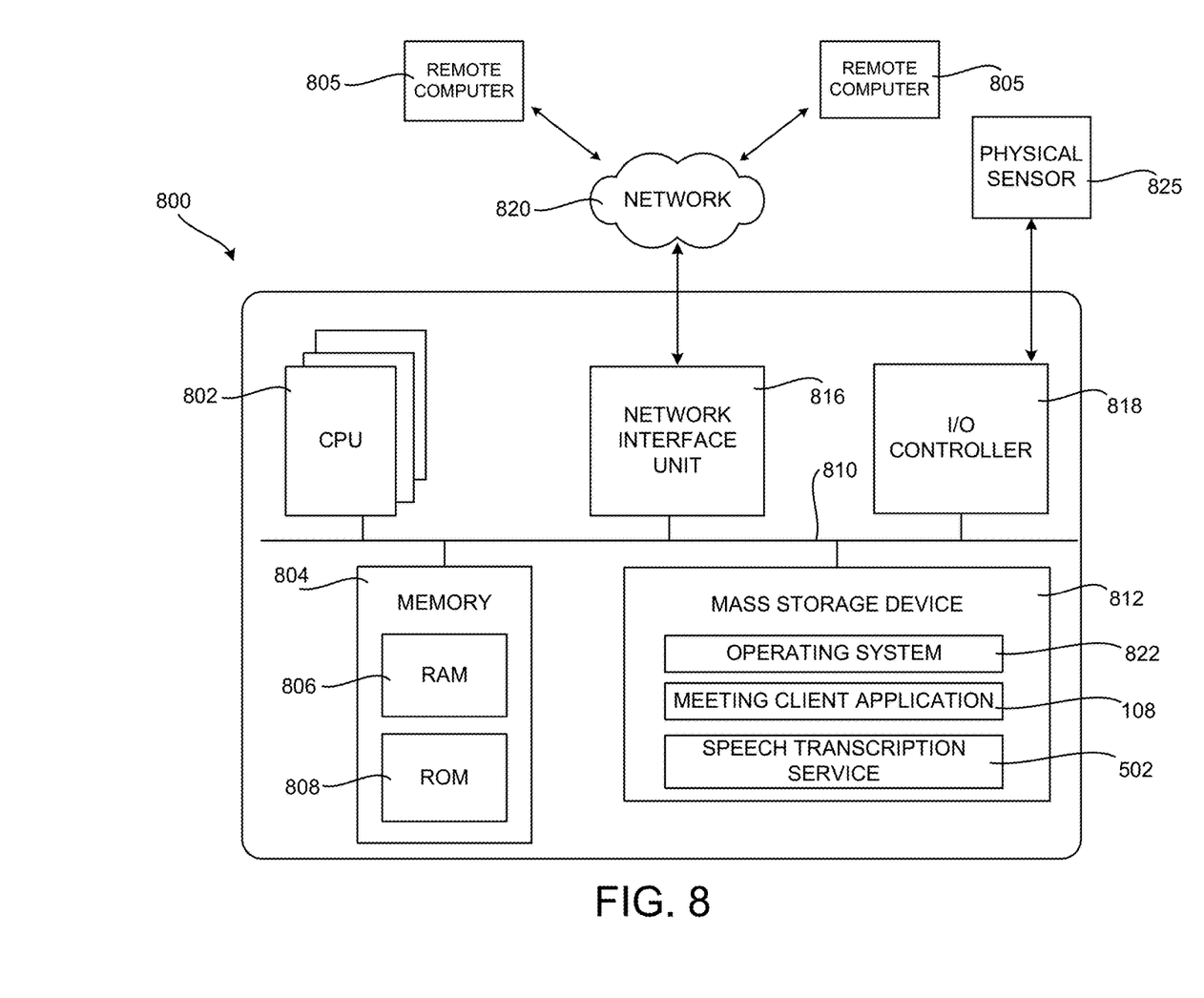
FIG. 8 is a computer architecture diagram showing an illustrative computer hardware and software architecture for a computing device that can implement aspects of the technologies presented herein.

FIG. 8 is a computer architecture diagram showing an illustrative computer hardware and software architecture for a data processing system that can implement the various technologies presented herein. In particular, the architecture illustrated in FIG. 8 can be utilized to implement a server computer, mobile phone, an e-reader, a smartphone, a desktop computer, an AR/VR device, a tablet computer, a laptop computer, or another type of computing device.

The data processing system 800 illustrated in FIG. 8 includes a central processing unit 802 ("CPU"), a system memory 804, including a random-access memory 806 ("RAM") and a read-only memory ("ROM") 808, and a system bus 810 that couples the memory 804 to the CPU 802. A basic input/output system ("BIOS" or "firmware") containing the basic routines that help to transfer information between elements within the data processing system 800, such as during startup, can be stored in the ROM 808. The data processing system 800 further includes a mass storage device 812 for storing an operating system 822, application programs, and other types of programs. For example, the mass storage device 812 might store the meeting client application 108 when utilized to implement a computing device 106. The mass storage device 812 might store the speech transcription service 502 when utilized to implement a computing system in the context-aware transcription system 102. The mass storage device 812 can also be configured to store other types of programs and data.

The mass storage device 812 is connected to the CPU 802 through a mass storage controller (not shown) connected to the bus 810. The mass storage device 812 and its associated computer readable media provide non-volatile storage for the data processing system 800. Although the description of computer readable media contained herein refers to a mass storage device, such as a hard disk, CD-ROM drive, DVD-ROM drive, or USB storage key, it should be appreciated by those skilled in the art that computer readable media can be any available computer storage media or communication media that can be accessed by the data processing system 800.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

By way of example, and not limitation, computer storage media can include volatile and non-volatile, removable and non-removable media implemented in any method or technology for storage of information such as computer readable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the data processing system 800. For purposes of the claims, the phrase "computer storage medium," and variations thereof, does not include waves or signals per se or communication media.

According to various configurations, the data processing system 800 can operate in a networked environment using logical connections to remote computers through a network such as the network 820. The data processing system 800 can connect to the network 820 through a network interface unit 816 connected to the bus 810. It should be appreciated that the network interface unit 816 can also be utilized to connect to other types of networks and remote computer systems. The data processing system 800 can also include an input/output controller 818 for receiving and processing input from a number of other devices, including a keyboard, mouse, touch input, an electronic stylus (not shown in FIG. 8), or a physical sensor such as a video camera. Similarly, the input/output controller 818 can provide output to a display screen or other type of output device (also not shown in FIG. 8).

It should be appreciated that the software components described herein, when loaded into the CPU 802 and executed, can transform the CPU 802 and the overall data processing system 800 from a general-purpose computing device into a special-purpose computing device customized to facilitate the functionality presented herein. The CPU 802 can be constructed from any number of transistors or other discrete circuit elements, which can individually or collectively assume any number of states. More specifically, the CPU 802 can operate as a finite-state machine, in response to executable instructions contained within the software modules disclosed herein. These computer-executable instructions can transform the CPU 802 by specifying how the CPU 802 transitions between states, thereby transforming the transistors or other discrete hardware elements constituting the CPU 802.

Encoding the software modules presented herein can also transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the data processing system 800 in order to store and execute the software components presented herein. It also should be appreciated that the architecture shown in FIG. 8 for the data processing system 800, or a similar architecture, can be utilized to implement other types of computing devices, including hand-held computers, video game devices, embedded computer systems, mobile devices such as smartphones, tablets, and AR/VR devices, and other types of computing devices known to those skilled in the art. It is also contemplated that the data processing system 800 might not include all of the components shown in FIG. 8, can include other components that are not explicitly shown in FIG. 8, or can utilize an architecture completely different than that shown in FIG. 8.

Figure 9:
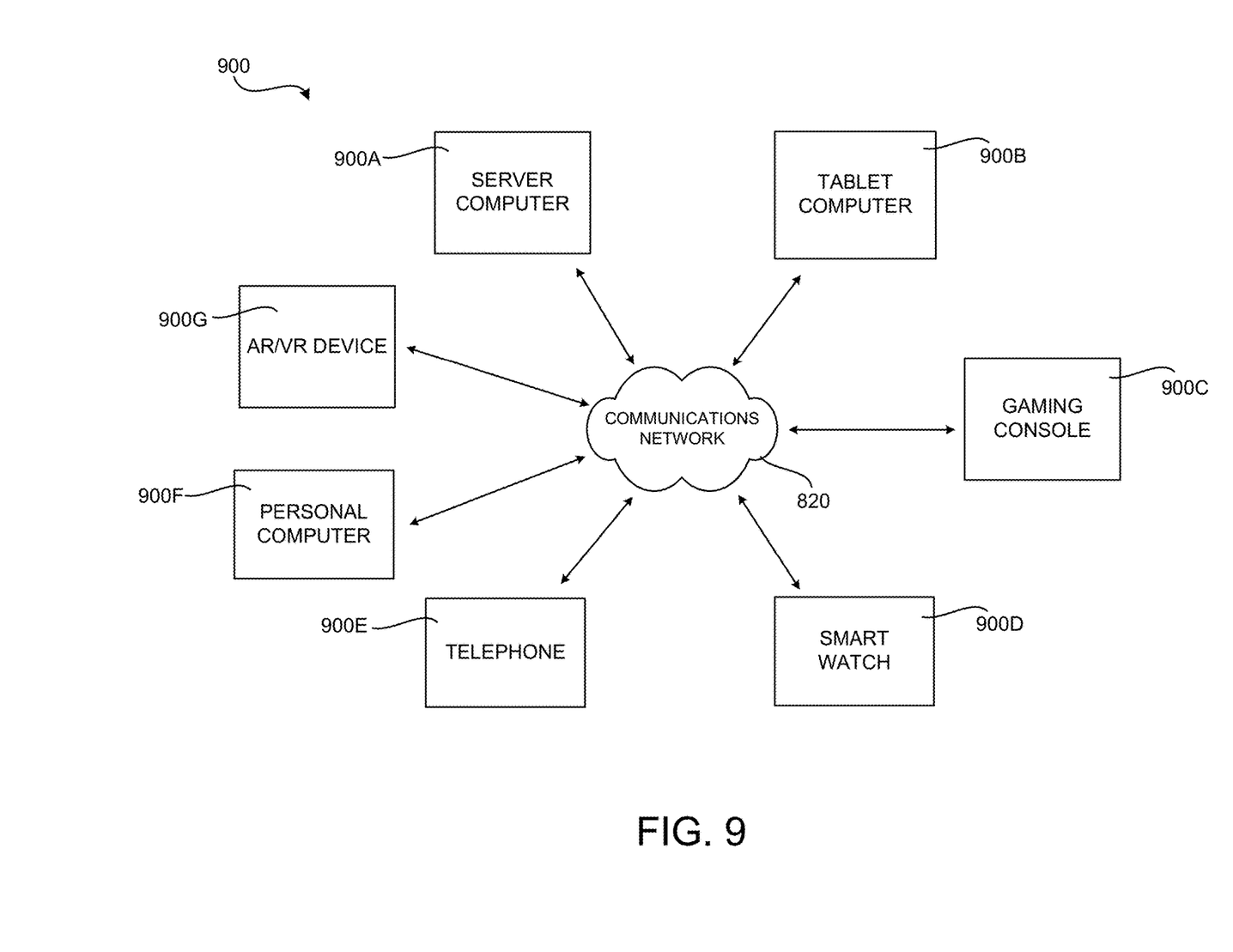
FIG. 9 is a network diagram illustrating a distributed computing environment in which aspects of the disclosed technologies can be implemented.

FIG. 9 is a network diagram illustrating a distributed network computing environment 900 in which aspects of the disclosed technologies can be implemented, according to various embodiments presented herein. As shown in FIG. 9, one or more server computers 900A can be interconnected via a communications network 820 (which may be either of, or a combination of, a fixed-wire or wireless LAN, WAN, intranet, extranet, peer-to-peer network, virtual private network, the Internet, Bluetooth communications network, proprietary low voltage communications network, or other communications network) with a number of client computing devices such as, but not limited to, a tablet computer 900B, a gaming console 900C, a smart watch 900D, a telephone 900E, such as a smartphone, a personal computer 900F, and an AR/VR device 900G.

In a network environment in which the communications network 820 is the Internet, for example, the server computer 900A can be a dedicated server computer operable to process and communicate data to and from the client computing devices 900B-900G via any of a number of known protocols, such as, hypertext transfer protocol ("HTTP"), file transfer protocol ("FTP"), or simple object access protocol ("SOAP"). Additionally, the networked computing environment 900 can utilize various data security protocols such as secured socket layer ("SSL") or pretty good privacy ("PGP"). Each of the client computing devices 900B-900G can be equipped with an operating system operable to support one or more computing applications or terminal sessions such as a web browser (not shown in FIG. 9), or other graphical user interface (not shown in FIG. 9), or a mobile desktop environment (not shown in FIG. 9) to gain access to the server computer 900A.

The server computer 900A can be communicatively coupled to other computing environments (not shown in FIG. 9) and receive data regarding a participating user's interactions/resource network. In an illustrative operation, a user (not shown in FIG. 9) may interact with a computing application running on a client computing device 900B-900G to obtain desired data and/or perform other computing applications.

The data and/or computing applications may be stored on the server 900A, or servers 900A, and communicated to cooperating users through the client computing devices 900B-900G over an exemplary communications network 820. A participating user (not shown in FIG. 9) may request access to specific data and applications housed in whole or in part on the server computer 900A. These data may be communicated between the client computing devices 900B-900G and the server computer 900A for processing and storage.

The server computer 900A can host computing applications, processes and applets for the generation, authentication, encryption, and communication of data and applications, and may cooperate with other server computing environments (not shown in FIG. 9), third party service providers (not shown in FIG. 9), network attached storage ("NAS") and storage area networks ("SAN") to realize application/data transactions.

It should be appreciated that the computing architecture shown in FIG. 8 and the distributed network computing environment shown in FIG. 9 have been simplified for ease of discussion. It should also be appreciated that the computing architecture and the distributed computing network can include and utilize many more computing components, devices, software programs, networking devices, and other components not specifically described herein.

The disclosure presented herein also encompasses the subject matter set forth in the following clauses:

Clause 1. A computer-implemented method performed by a data processing system, the computer-implemented method comprising: retrieving meeting-specific data associated with a meeting, the meeting-specific data comprising data associated with attendees of the meeting; generating a meeting-specific statistical language model based on the meeting-specific data; generating a transcription of audio generated during the meeting using the meeting-specific statistical language model; and providing the transcription of the audio generated during the meeting to one or more computing devices for presentation in a user interface (UI).

Clause 2. The computer-implemented method of clause 1, wherein the meeting-specific data comprises one or more of messages associated with the attendees of the meeting, attachments to the messages, names of the attendees, or files associated with the attendees.

Clause 3. The computer-implemented method of clauses 1 or 2, further comprising storing the meeting-specific statistical language model for a duration of the meeting.

Clause 4. The computer-implemented method of any of clauses 1-3, wherein generation of the meeting-specific statistical language model occurs in response to receiving a pre-meeting signal comprising data identifying a start time for the meeting.

Clause 5. The computer-implemented method of any of clauses 1-4, wherein the pre-meeting signal is generated a predetermined amount of time prior to the start time of the meeting.

Clause 6. The computer-implemented method of any of clauses 1-5, wherein the pre-determined amount of time is calculated by retrieving data identifying the start time for the meeting on a predetermined schedule.

Clause 7. The computer-implemented method of any of clauses 1-6, wherein the meeting-specific statistical language model defines a probability distribution of word occurrences for words in the meeting-specific data, and wherein generating the transcription of audio generated during the meeting using the meeting-specific statistical language model comprises using the meeting-specific statistical language model to determine probabilities of spoken words in the audio and generating the transcription based upon the probabilities.

Clause 8. A computer-readable storage medium having computer-executable instructions stored thereupon which, when executed by a processor, cause the processor to: retrieve meeting-specific data associated with a meeting, the meeting-specific data comprising data associated with attendees of the meeting; generate a meeting-specific statistical language model using the meeting-specific data; and generate a transcription of audio of the meeting using the meeting-specific statistical language model.

Clause 9. The computer-readable storage medium of clause 8, having further computer-executable instructions stored thereupon to transmit the transcription of the audio of the meeting to one or more computing devices for presentation in a user interface (UI) during a time of the meeting.

Clause 10. The computer-readable storage medium of clauses 8 or 9, wherein the meeting-specific data comprises one or more of messages associated with the attendees of the meeting, attachments to the messages, names of the attendees, or files associated with the attendees.

Clause 11. The computer-readable storage medium of any of clauses 8-10, wherein the transcription of the audio of the meeting is further generated, at least in part, using a base statistical language model.

Clause 12. The computer-readable storage medium of any of clauses 8-11, wherein generation of the meeting-specific statistical language model occurs in response to receiving a pre-meeting signal comprising data identifying a start time for the meeting.

Clause 13. The computer-readable storage medium of any of clauses 8-12, wherein the pre-meeting signal is generated a predetermined amount of time prior to the start time of the meeting.

Clause 14. The computer-readable storage medium of any of clauses 8-13, wherein the pre-meeting signal is generated responsive to receiving meeting change event notifications.

Clause 15. An apparatus for generating a transcription of audio of a meeting, the apparatus comprising: means for retrieving meeting-specific data associated with the meeting, the meeting-specific data comprising data associated with attendees of the meeting; means for generating a meeting-specific statistical language model based on the meeting-specific data; and means for generating a transcription of the audio of the meeting using the meeting-specific statistical language model.

Clause 16. The apparatus of clause 15, further comprising means for providing the transcription of the audio of the meeting to one or more computing devices for presentation in a user interface (UI) during the meeting.

Clause 17. The apparatus of clauses 15 or 16, wherein the meeting-specific data associated with the meeting is retrieved responsive to receiving a signal generated on a predefined schedule prior to the meeting.

Clause 18. The apparatus of any of clauses 15-17, wherein the meeting-specific data associated with the meeting is retrieved responsive to receiving an event notification prior to or after a start of the meeting.

Clause 19. The apparatus any of clauses 15-18, wherein the meeting-specific data comprises one or more of messages associated with the attendees of the meeting, attachments to the messages, names of the attendees, or files associated with the attendees.

Clause 20. The apparatus any of clauses 15-19, wherein the transcription of the audio of the meeting is further generated, at least in part, using a base statistical language model.

Although the technologies presented herein have been described in language specific to structural features and/or methodological acts, it is to be understood that the appended claims are not necessarily limited to the features or acts described. Rather, the features and acts are described as example implementations of such technologies. Moreover, the above-described subject matter may be implemented as a computer-controlled apparatus, a computer process, a computing system, or as an article of manufacture such as a computer-readable storage medium.

The operations of the example methods presented herein are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations.

Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more instances of hardware logic such as FPGAs, DSPs, or other types of accelerators.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. A computer-implemented method performed by a data processing system, the computer-implemented method comprising:
   retrieving meeting-specific data associated with a meeting, the meeting-specific data comprising data associated with attendees of the meeting, wherein the meeting-specific data is retrieved for a predefined time period prior to a start time of the meeting;
   generating a meeting-specific statistical language model based on the meeting-specific data, wherein the meeting-specific statistical language model includes terminology derived from an analysis of the meeting-specific data;
   generating a transcription of audio generated during the meeting using the meeting-specific statistical language model; and
   providing the transcription of the audio generated during the meeting to one or more computing devices for presentation in a user interface (UI).

2. The computer-implemented method of claim 1, wherein the meeting-specific data comprises one or more of messages associated with the attendees of the meeting, attachments to the messages, names of the attendees, or files associated with the attendees.

3. The method of claim 1, wherein the predefined time period is configured by one or more users associated with the meeting.

4. The computer-implemented method of claim 1, wherein generation of the meeting-specific statistical language model occurs in response to receiving a pre-meeting signal comprising data identifying a start time for the meeting.

5. The computer-implemented method of claim 4, wherein the pre-meeting signal is generated a predetermined amount of time prior to the start time of the meeting.

6. The computer-implemented method of claim 5, wherein the pre-determined amount of time is calculated by retrieving data identifying the start time for the meeting on a predetermined schedule.

7. The computer-implemented method of claim 4, wherein the meeting-specific statistical language model defines a probability distribution of word occurrences for words in the meeting-specific data, and wherein generating the transcription of audio generated during the meeting using the meeting-specific statistical language model comprises using the meeting-specific statistical language model to determine probabilities of spoken words in the audio and generating the transcription based upon the probabilities.

8. The method of claim 1 further comprising:
   translating the transcription from a first language into a second language to generate a translated transcription; and
   providing the translated transcription to one or more computing devices for presentation in the UI.

9. A computer-readable storage medium having computer-executable instructions stored thereupon which, when executed by a processor, cause the processor to:
   retrieve meeting-specific data associated with a meeting, the meeting-specific data comprising data associated with attendees of the meeting, wherein the meeting-specific data is retrieved for a predefined time period prior to a start time of the meeting;
   generate a meeting-specific statistical language model using the meeting-specific data, wherein the meeting-specific statistical language model includes terminology derived from an analysis of the meeting-specific data; and
   generate a transcription of audio of the meeting using the meeting-specific statistical language model.

10. The computer-readable storage medium of claim 9, wherein the meeting-specific data comprises one or more of messages associated with the attendees of the meeting, attachments to the messages, names of the attendees, or files associated with the attendees.

11. The computer-readable storage medium of claim 9, wherein the transcription of the audio of the meeting is further generated, at least in part, using a base statistical language model.

12. The computer-readable storage medium of claim 9, wherein generation of the meeting-specific statistical language model occurs in response to receiving a pre-meeting signal comprising data identifying a start time for the meeting.

13. The computer-readable storage medium of claim 9, wherein the pre-meeting signal is generated a predetermined amount of time prior to the start time of the meeting.

14. The computer-readable storage medium of claim 9, wherein the pre-meeting signal is generated responsive to receiving meeting change event notifications.

15. An apparatus for generating a transcription of audio of a meeting, the apparatus comprising:
   means for retrieving meeting-specific data associated with the meeting, the meeting-specific data comprising data associated with attendees of the meeting, wherein the meeting-specific data is retrieved for a predefined time period prior to a start time of the meeting;
   means for generating a meeting-specific statistical language model based on the meeting-specific data, wherein the meeting-specific statistical language model includes terminology derived from an analysis of the meeting-specific data; and
   means for generating a transcription of the audio of the meeting using the meeting-specific statistical language model.

16. The apparatus of claim 15, further comprising means for providing the transcription of the audio of the meeting to one or more computing devices for presentation in a user interface (UI) during the meeting.

17. The apparatus of claim 15, wherein the meeting-specific data associated with the meeting is retrieved responsive to receiving a signal generated on a predefined schedule prior to the meeting.

18. The apparatus of claim 15, wherein the meeting-specific data associated with the meeting is retrieved responsive to receiving an event notification prior to or after a start of the meeting.

19. The apparatus of claim 15, wherein the meeting-specific data comprises one or more of messages associated with the attendees of the meeting, attachments to the messages, names of the attendees, or files associated with the attendees.

20. The computer-readable storage medium of claim 9, having further computer-executable instructions stored thereupon to transmit the transcription of the audio of the meeting to one or more computing devices for presentation in a user interface (UI) during a time of the meeting.

\* \* \* \* \*